United States Patent
Fruhauf et al.

(10) Patent No.: US 8,528,096 B2
(45) Date of Patent: Sep. 3, 2013

(54) SECURE UNIVERSAL SERIAL BUS (USB) STORAGE DEVICE AND METHOD

(75) Inventors: Serge F. Fruhauf, Cupertino, CA (US); Jerome Tournemille, Pourrieres (FR)

(73) Assignees: STMicroelectronics, Inc., Coppell, TX (US); STMicroelectronics S.A., Montrouge (FR)

( * ) Notice: Subject to any disclaimer, the term of this patent is extended or adjusted under 35 U.S.C. 154(b) by 1025 days.

(21) Appl. No.: 11/246,600

(22) Filed: Oct. 7, 2005

(65) Prior Publication Data

US 2007/0083939 A1    Apr. 12, 2007

(51) Int. Cl.
*G06F 21/00* (2006.01)

(52) U.S. Cl.
USPC ............. 726/26; 713/170; 713/182; 713/185; 713/186; 713/193

(58) Field of Classification Search
USPC ............... 705/51, 57, 64, 65, 66, 67, 76, 405; 713/159, 161, 165, 166, 167, 172, 176, 183, 713/184, 185, 186, 193; 726/4, 5, 14, 17, 726/19, 20, 21, 27, 28, 30, 9, 26; 235/431, 235/441
See application file for complete search history.

(56) References Cited

U.S. PATENT DOCUMENTS

| | | | |
|---|---|---|---|
| 6,088,802 A * | 7/2000 | Bialick et al. | 726/3 |
| 7,069,447 B1 * | 6/2006 | Corder | 713/189 |
| 2001/0016887 A1 * | 8/2001 | Toombs et al. | 710/102 |
| 2001/0037452 A1 * | 11/2001 | Go et al. | 713/168 |
| 2001/0038032 A1 * | 11/2001 | Kang et al. | 235/375 |
| 2002/0010827 A1 * | 1/2002 | Cheng | 711/103 |
| 2002/0073340 A1 * | 6/2002 | Mambakkam et al. | 713/202 |
| 2002/0087857 A1 * | 7/2002 | Tsao et al. | 713/155 |
| 2002/0095389 A1 * | 7/2002 | Gaines | 705/67 |
| 2002/0188856 A1 * | 12/2002 | Worby | 713/193 |
| 2003/0046472 A1 * | 3/2003 | Morrow | 710/305 |
| 2003/0174167 A1 * | 9/2003 | Poo et al. | 345/752 |
| 2003/0217166 A1 * | 11/2003 | Dal Canto et al. | 709/229 |
| 2004/0003262 A1 * | 1/2004 | England et al. | 713/189 |
| 2004/0015709 A1 * | 1/2004 | Chen et al. | 713/193 |
| 2004/0068631 A1 * | 4/2004 | Ukeda et al. | 711/163 |
| 2004/0073726 A1 * | 4/2004 | Margalit et al. | 710/72 |
| 2004/0117664 A1 * | 6/2004 | Colvin | 713/202 |

(Continued)

OTHER PUBLICATIONS

Yang et al., Optimized structure for fast data storage to non-volatile memory with minimum chip size, Aug. 2004, 7th International Conference on Signal Processing ICSP'04 Proceedings, vol. 3, pp. 2473-2476.*

*Primary Examiner* — Taghi Arani
*Assistant Examiner* — Kenneth Chang
(74) *Attorney, Agent, or Firm* — Munck Wilson Mandala, LLP (57) ABSTRACT

A secure Universal Serial Bus (USB) storage device includes a memory controller capable of storing data in and retrieving data from a memory. The secure USB storage device also includes a USB secure microcontroller capable of authorizing access to the memory through the memory controller to thereby secure the memory. The USB secure microcontroller is also capable of protecting the data stored in the memory to thereby secure contents of the memory. The USB secure microcontroller could include an SPI interface and/or a GPIO interface emulating one or more of an SPI interface and an MMC interface to the memory controller. The memory controller could include an SPI interface and/or an MMC interface to the USB secure microcontroller. The secure USB storage device may be enumerated by a USB host controller under one or more device classes.

14 Claims, 2 Drawing Sheets

(56) References Cited

U.S. PATENT DOCUMENTS

| | | | |
|---|---|---|---|
| 2004/0193925 A1* | 9/2004 | Safriel | 713/202 |
| 2004/0211835 A1* | 10/2004 | Tournemille et al. | 235/441 |
| 2004/0254014 A1* | 12/2004 | Quraishi et al. | 463/29 |
| 2005/0010768 A1* | 1/2005 | Light et al. | 713/168 |
| 2005/0039027 A1* | 2/2005 | Shapiro | 713/186 |
| 2005/0066069 A1* | 3/2005 | Kaji | 710/1 |
| 2005/0081064 A1* | 4/2005 | Ooi et al. | 713/202 |
| 2005/0083741 A1* | 4/2005 | Chang et al. | 365/200 |
| 2005/0116026 A1* | 6/2005 | Burger et al. | 235/380 |
| 2005/0144443 A1* | 6/2005 | Cromer et al. | 713/165 |
| 2005/0160244 A1* | 7/2005 | Peinado | 711/163 |
| 2005/0182881 A1* | 8/2005 | Chou et al. | 710/301 |
| 2005/0206353 A1* | 9/2005 | Sengoku | 323/210 |
| 2005/0251589 A1* | 11/2005 | Wang | 710/5 |
| 2006/0161445 A1* | 7/2006 | Frank | 705/1 |
| 2006/0174135 A1* | 8/2006 | Takaku et al. | 713/186 |
| 2006/0190941 A1* | 8/2006 | Kobayashi et al. | 717/174 |

* cited by examiner

SECURE UNIVERSAL SERIAL BUS (USB) STORAGE DEVICE AND METHOD

TECHNICAL FIELD

This disclosure is generally directed to secure devices and more specifically to a secure Universal Serial Bus (USB) storage device and method.

BACKGROUND

Portable storage devices are routinely used to transfer data between computing devices or other devices. For example, Universal Serial Bus (USB) memory sticks, USB Flash memory drives, USB Flash memory cards, and other portable devices are often used to transfer data, image, or music files between computing devices or other devices. These portable devices offer great convenience to users, allowing the users to easily transfer data between devices.

Often times, the data stored on a portable storage device needs to be protected in some way. For example, the data may need to be protected because of privacy concerns, corporate or government security concerns, or copyright reasons. One solution has been to integrate "smartcard" functionality into a memory controller in a conventional portable storage device. Another solution has been to add an encryption device that acts as a slave to the memory controller in a conventional portable storage device. However, these solutions suffer from various problems or shortcomings, such as creating a weakness link or vulnerable point between the memory controller and the encryption device or remaining vulnerable to side channel attacks.

SUMMARY

This disclosure provides a secure Universal Serial Bus (USB) storage device and method.

In a first embodiment, an apparatus includes a memory controller capable of storing data in and retrieving data from a memory. The apparatus also includes a Universal Serial Bus (USB) secure microcontroller capable of authorizing access to the memory through the memory controller to thereby secure the memory. The USB secure microcontroller is also capable of protecting the data stored in the memory to thereby secure contents of the memory.

In a particular embodiment, the USB secure microcontroller includes an interface to the memory controller, where the interface includes at least one of: a Serial Peripheral Interface (SPI) and a General Purpose Input/Output (GPIO) interface emulating one or more of an SPI interface and a MultiMediaCard (MMC) interface. In another particular embodiment, the memory controller includes an interface to the USB secure microcontroller, where the interface includes at least one of: an SPI interface and an MMC interface.

In yet another particular embodiment, the secure USB storage device is enumerated by a USB host controller under a Chip Card Interface Device (CCID) class, an Integrated Circuit Card Interface Device (ICCID) class, a Mass Storage Class (MSC), a combination of the CCID class and the MSC class, or a combination of the ICCID class and the MSC class.

In a second embodiment, a system includes a Universal Serial Bus (USB) host controller coupled to a USB bus and a USB storage device. The USB storage device includes a USB storage device. The USB storage device includes a memory controller capable of storing data in and retrieving data from a memory. The USB storage device also includes a USB secure microcontroller capable of authorizing access to the memory through the memory controller to thereby secure the memory. The USB secure microcontroller is also capable of protecting the data stored in the memory to thereby secure contents of the memory.

In a particular embodiment, the USB secure microcontroller is capable of protecting the data stored in the memory by ensuring that the data stored in the memory is encrypted.

In a third embodiment, a method includes storing information in and retrieving information from a memory in a Universal Serial Bus (USB) storage device. Access to the memory is provided by a memory controller. The method also includes authorizing access to the memory through the memory controller to thereby secure the memory and protecting the data stored in the memory to thereby secure contents of the memory using a USB secure microcontroller.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
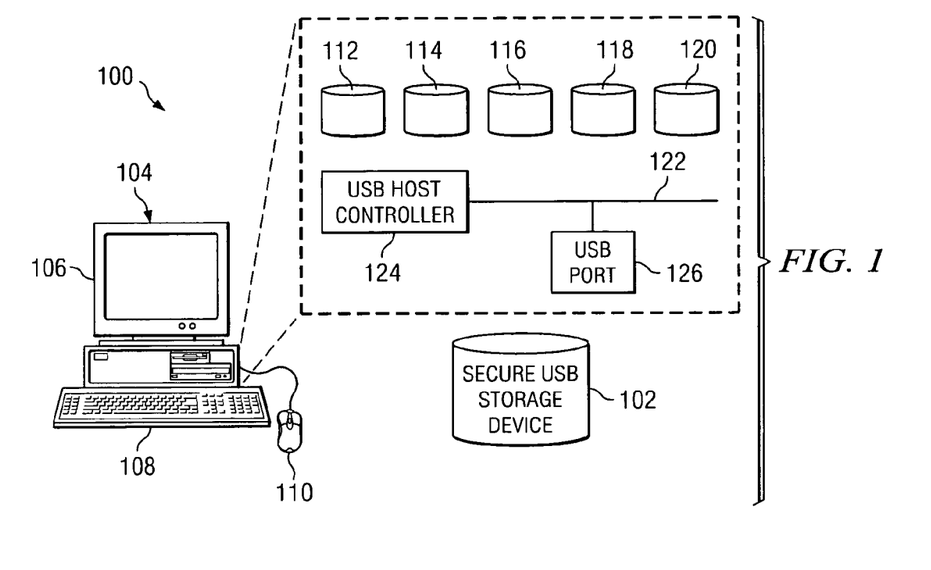
FIG. 1 illustrates an example system with a secure Universal Serial Bus (USB) storage device according to one embodiment of this disclosure.

FIG. 1 illustrates an example system 100 with a secure Universal Serial Bus (USB) storage device 102 according to one embodiment of this disclosure. The system 100 shown in FIG. 1 is for illustration only. The secure USB storage device 102 could be used in any suitable system or with any suitable device.

Figure 2:
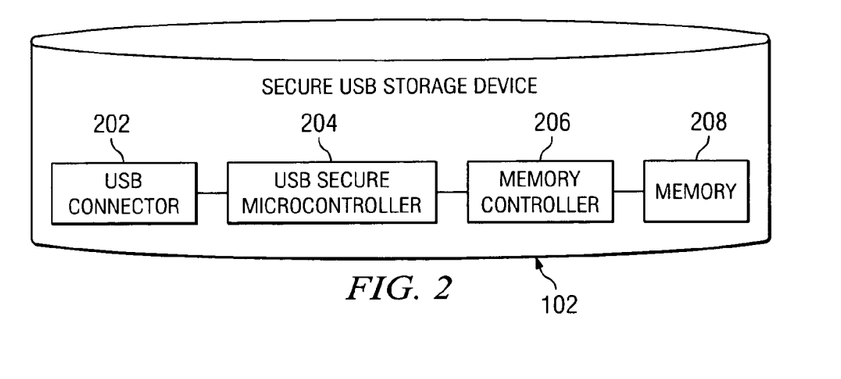
FIG. 2 illustrates an example secure USB storage device according to one embodiment of this disclosure.

As shown in FIG. 1, the system 100 includes the secure USB storage device 102 and a host 104. The secure USB storage device 102 is capable of storing data, such as data provided by the host 104 or data to be provided to the host 104. Also, as explained in more detail below, access to a memory storing the data or access to the data itself in the secure USB storage device 102 is secured, which helps to protect against tampering or other illicit access. The secure USB storage device 102 includes any suitable device for securely storing data. As an example, the secure USB storage device 102 could represent a USB key or other portable USB storage device. One example embodiment of the secure USB storage device 102 is shown in FIG. 2, which is described below.

The host 104 in FIG. 1 represents a desktop computer. In this example, the host 104 includes various input/output devices, such as a monitor 106, a keyboard 108, and a mouse 110. Items within the dashed lines of FIG. 1 represent additional components within the host 104. As shown in FIG. 1, the host 104 also includes a processor 112, a random access memory (RAM) 114, a read only memory (ROM) 116, a magnetic storage device 118 such as a hard drive, and an optical drive 120 for reading from and/or writing to an optical storage medium such as a compact disc (CD) or digital versatile disc (DVD). This represents one possible arrangement of the host 104. Any other host 104 having any other arrangement may be used with the secure USB storage device 102.

As shown in FIG. 1, the host 104 also includes a USB bus 122. The USB bus 122 allows various components of the host 104 to communicate with one another or with external peripheral devices. For example, the USB bus 122 may allow the processor 112 to receive data from the keyboard 108 and the mouse 110. The USB bus 122 may also allow the processor 112 to receive data from a scanner and to send data to a printer. The USB bus 122 could be used in any other suitable manner. The USB bus 122 represents any suitable USB bus, such as a bus supporting USB 1.0, USB 1.1, USB 2.0, and/or any other past, present, or future USB specification.

The USB bus 122 is coupled to and controlled by a USB host controller 124. The USB host controller 124 controls the communication of data over the USB bus 122. For example, the USB host controller 124 may enumerate the secure USB storage device 102 before allowing data to be sent to or retrieved from the secure USB storage device 102 over the USB bus 122. The USB host controller 124 or the host 104 could also validate or authenticate the secure USB storage device 102, encrypt data for transmission to the secure USB storage device 102, and decrypt data received from the secure USB storage device 102 with the proper encryption or decryption mechanism shared with the USB storage device 102. The USB host controller 124 includes any hardware, software, firmware, or combination thereof for controlling a USB bus.

The USB bus 122 is coupled to a USB port 126. The USB port 126 is capable of coupling an external device (such as the secure USB storage device 102) to the USB bus 122. The external device could be coupled directly to the USB port 126 or indirectly to the USB port 126, such as when the external device is coupled to the USB port 126 via a USB cable or other mechanical lock system. The USB port 126 represents any suitable structure capable of providing access to the USB bus 122.

In one aspect of operation, a user may connect the secure USB storage device 102 to the host 104. This may include, for example, the user inserting a USB connector of the secure USB storage device 102 into the USB port 126. The USB host controller 124 enumerates and the USB host controller 124 or the host 104 validates the secure USB storage device 102. Validation of the secure USB storage device 102 could take many forms. For example, it could include (i) issuing a challenge and determining if an expected response is received, or (ii) using public key infrastructure (PKI) technology or other suitable mechanisms to determine if the secure USB storage device 102 contains a valid digital certificate or key. In particular embodiments, the valid digital certificate or key associated with the secure USB storage device 102 is stored in a memory or portion of memory of a secure microcontroller that is not accessible.

Once validated, the USB host controller 124 or the host 104 could also validate the user using the secure USB storage device 102. Again, validation of the user could take many forms, including determining if the secure USB storage device 102 contains a valid digital certificate or key associated with the user. In particular embodiments, the valid digital certificate or key associated with the user is stored in a memory or portion of memory of a secure microcontroller that is accessible by authorized users.

In addition, data transported over the USB bus 122 to and from the secure USB storage device 102 could be encrypted, and the secure USB storage device 102 may encrypt and decrypt data as required. Also, the secure USB storage device 102 could validate any received data prior to storage or any request to retrieve data, such as by ensuring that the received data or request is associated with an expected or valid digital certificate or key.

Through these or other validation techniques, data sent to and received from the USB storage device 102 is more secure. For example, using the functions described above or other or additional security functions, the secure USB storage device 102 may provide a greater level of privacy and protection for the user. Also, different levels of security may be provided to the user depending on the circumstances. As an example, different levels of security may be provided by requiring validation of different combinations of the secure USB storage device 102, the user, data to be stored, or requests for data before data can be sent to and received from the device 102. The level of security could be specified in any suitable manner. In addition, the secure USB storage device 102 may or may not encrypt and/or decrypt the data stored in or retrieved from the device 102. This may allow, for example, the secure USB storage device 102 to receive, store, and retrieve encrypted user data without decrypting the data. This may also allow the secure USB storage device 102 to encrypt user data prior to communication of the data over the USB bus 122.

In this way, the secure USB storage device 102 becomes a tamper-resistant device providing a greater level of security for data. Moreover, the secure USB storage device 102 could include a high-density memory, allowing the device 102 to store and secure large amounts of data. In addition, the secure USB storage device 102 provides a high-level security device that could be used in a system to protect against so-called "phishing" and other attacks, where data is obtained by mimicking the identity of a party.

Although FIG. 1 illustrates one example of a system 100 with a secure USB storage device 102, various changes may be made to FIG. 1. For example, the secure USB storage device 102 could be used with any other computing device or system. Also, the secure USB storage device 102 could be used with any other suitable device or system, such as any device containing a USB host controller. As particular examples, the secure USB storage device 102 could also be used with digital music players, digital video players, handheld computers, portable computers, or any other or additional devices.

FIG. 2 illustrates an example secure USB storage device 102 according to one embodiment of this disclosure. The embodiment of the secure USB storage device 102 shown in FIG. 2 is for illustration only. Other embodiments of the secure USB storage device 102 may be used without departing from the scope of this disclosure. Also, for ease of explanation, the secure USB storage device 102 of FIG. 2 is described as operating with the host 104 in the system 100 of FIG. 1. The secure USB storage device 102 could be used in any other suitable system and with any other suitable device.

In this example, the secure USB storage device 102 includes a USB connector 202, a USB secure microcontroller 204, a memory controller 206, and a memory 208. The USB connector 202 is capable of coupling the secure USB storage device 102 to a USB bus. For example, the USB connector 202 could couple the secure USB storage device 102 to the USB port 126, thereby coupling the secure USB storage device 102 to the USB bus 122. The USB connector 202 represents any suitable structure capable of connecting the secure USB storage device 102 to a USB bus.

Figure 3:
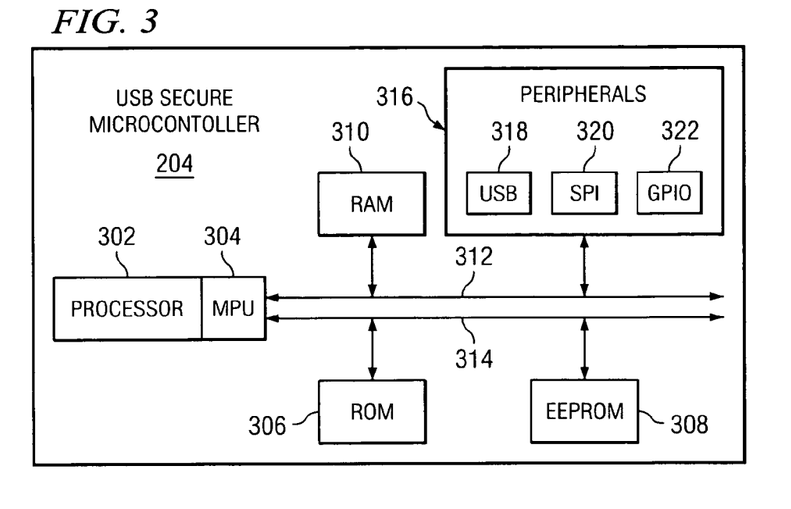
FIG. 3 illustrates an example USB secure microcontroller in a secure USB storage device according to one embodiment of this disclosure.

The USB secure microcontroller 204 is coupled to the USB connector 202 and the memory controller 206. The USB secure microcontroller 204 is capable of resisting external attacks such as physical attacks, software attacks, or environment or "side channel" attacks. Because of this, the USB secure microcontroller 204 generally represents a tamper-resistant microcontroller. The USB secure microcontroller 204 also facilitates access to and communication over a USB bus by the secure USB storage device 102. For example, the USB secure microcontroller 204 could communicate information necessary for enumeration or validation by the USB host controller 124 or by the host 104 over the USB bus 122. The USB secure microcontroller 204 may also receive data to be stored in the secure USB storage device 102 and provide the data to the memory controller 206 for storage. In addition, the USB secure microcontroller 204 may receive a request to retrieve data stored in the secure USB storage device 102, interact with the memory controller 206 to retrieve the requested data, and provide the requested data over the USB bus 122. The USB secure microcontroller 204 may encrypt or decrypt the data being stored in or retrieved from the secure USB storage device 102, such as by encrypting data being retrieved from the memory 208 and transmitted over the USB bus 122. The USB secure microcontroller 204 includes any hardware, software, firmware, or combination thereof for providing access to a USB bus. The USB secure microcontroller 204 could, for example, represent an ST22T064 smartcard microcontroller from STMICROELECTRONICS, INC. having an eight-bit port configurable as a Serial Peripheral Interface (SPI) or a General Purpose Input/Output (GPIO) interface to the memory controller 206. One example embodiment of the USB secure microcontroller 204 is shown in FIG. 3, which is described below.

In some embodiments, the USB secure microcontroller 204 operates so that the secure USB storage device 102 appears to the host 104 as a smartcard. In particular embodiments, this allows the USB secure microcontroller 204 to offer the same level of security provided by smartcards, which is one of the better (if not the best) hardware security available.

In some embodiments, the USB secure microcontroller 204 also allows the secure USB storage device 102 to be enumerated by the USB host controller 124. The secure USB storage device 102 could be enumerated in one or more device classes. These device classes could include a Chip Card Interface Device (CCID) class, an Integrated Circuit Card Interface Device (ICCID) class, a Mass Storage Class (MSC), a combination of CCID and MSC, or a combination of ICCID and MSC.

Figure 4:
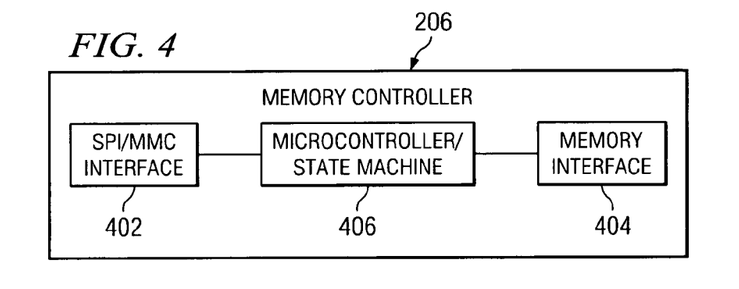
FIG. 4 illustrates an example memory controller in a secure USB storage device according to one embodiment of this disclosure.

The memory controller 206 is coupled to the USB secure microcontroller 204 and the memory 208. The memory controller 206 facilitates access to the memory 208. For example, the memory controller 206 could receive data from the USB secure microcontroller 204 and store the data in appropriate locations in the memory 208. The memory controller 206 could also receive requests for data from the USB secure microcontroller 204 and retrieve the requested data from the memory 208. The memory controller 206 includes any hardware, software, firmware, or combination thereof for controlling access to a memory. As an example, the memory controller 206 could represent a memory controller having a MultiMediaCard (MMC) interface to the memory 208. One example embodiment of the memory controller 206 is shown in FIG. 4, which is described below.

The memory 208 is coupled to the memory controller 206. The memory 208 is capable of storing and facilitating retrieval of data. The memory 208 represents any suitable type or types of memory, such as a volatile memory and/or a non-volatile memory like Flash memory. The memory 208 also represents any suitable quantity of memory. In some embodiments, the amount of memory 208 in the secure USB storage device 102 may be based on the speed of the USB interface between the device 102 and the host 104 or based on the application or use of the device 102. For example, slower interfaces (such as USB 2.0 full-speed) could result in a smaller memory 208 (such as 128 or 256 megabytes of memory space). Faster interfaces (such as USB 2.0 high-speed) could result in a larger memory 208 (such as one, four, or eight gigabytes of memory space). As another example, if the device 102 is used to store audio data (such as MP3 files), slower interfaces (such as USB 2.0 full-speed) could be used with a large memory 208 (such as one, four, or eight gigabytes of memory space). In this example, the audio data may be played at the MP3-encoded speed, and USB 2.0 full-speed works with this application. However, any suitable amount of memory 208 could be used, with or without consideration of the speed of the USB interface or the use of the device.

In some embodiments, the memory controller 206 and the memory 208 may be removable from the secure USB storage device 102. This may allow, for example, an adapter that includes the USB connector 202 and the USB secure microcontroller 204 to be provided to users. A user may insert a Flash memory card (having a memory 208 and a memory controller 206) into the adapter to form the secure USB storage device 102 shown in FIG. 2. In these embodiments, the secure USB storage device 102 may include a slot or other receptacle for receiving the memory controller 206 and the memory 208.

As described above, the secure USB storage device 102 and the user of the device 102 may need to be validated before data is read from or written to the device 102. The secure USB storage device 102 may also need to validate data to be written to the secure USB storage device 102 or requests to retrieve data from the memory 208. In some embodiments, to validate the secure USB storage device 102 or the user, the USB secure microcontroller 204 could receive a challenge from the USB host controller 124 or host 104, retrieve data from the memory 208 needed to respond to the challenge, and provide the data to the USB host controller 124 or host 104. In other embodiments, to validate the secure USB storage device 102 or the user, the USB secure microcontroller 204 could receive a coded challenge or other message from the USB host controller 124 or host 104, retrieve a digital certificate or key (either associated with the device 102 or the user), and use the digital certificate or key to provide a response to the USB host controller 124 or host 104. Any other or additional techniques could be used to validate the secure USB storage device 102 or the user. Any suitable technique could also be used to validate the data to be stored or requests for data.

As one particular example, the secure USB storage device 102 could be inserted into the USB port 126 and coupled to the USB bus 122. The USB host controller 124 enumerates the USB storage device 102 as a CCID-class or ICCID-class device, and the USB secure microcontroller 204 obtains rights and processes the authentication from the host 104. This allows the USB secure microcontroller 204 to ensure that the memory 208 is not visible to and accessible by the host 104 at plug-in until the device 102 or the user is authenticated. If the authentication process is successful, the USB secure microcontroller 204 may store information in a non-volatile memory (such as memory 208) so that access to the memory 208 is authorized after plug-off and a subsequent plug-in. After the subsequent plug-in, the USB storage device 102 is enumerated as a MSC-class device. In this example, the USB secure microcontroller 204 acts as a gatekeeper or a "lock-unlock" function to the memory 208, the data in the memory 208 may or may not be encrypted, and only access to the memory 208 is protected.

As another particular example, the secure USB storage device 102 could be inserted into the USB port 126, and the USB host controller 124 enumerates the USB storage device 102 as a CCID-class or ICCID-class device. After authentication, the secure USB storage device 102 could perform a dynamic detach and reattach as a CCID-MSC or ICCID-MSC device. Mass storage firmware could be loaded into a memory in the device 102 (such as a RAM) and executed from the memory. If the device 102 is unplugged, the mass storage functionality is no longer available (because of a RAM reset).

As yet another particular example, the USB host controller 124 enumerates the USB storage device 102 as a CCID-class or ICCID-class device. In this example, the device 102 could represent a USB smartcard device or token with additional memory 208. The data stored in the memory 208 (such as a memory card like Compact Flash memory) could be encrypted or unencrypted by the USB secure microcontroller 206. Communication between the USB secure microcontroller 206 can also be encrypted or unencrypted through a secure or non-secure channel.

In some embodiments, the USB secure microcontroller 204, the memory controller 206, and the memory 208 may represent individual chips that are positioned side-by-side in the secure USB storage device 102. In other embodiments, the USB secure microcontroller 204, the memory controller 206, and the memory 208 may represent individual chips that are stacked in a stacked-die configuration. The stacked-die configuration may make it more difficult to identify the interconnections between the chips, making it more difficult to observe or emulate the behavior of the chips.

Although FIG. 2 illustrates one example of a secure USB storage device 102, various changes may be made to FIG. 2. For example, while shown as containing a single memory 208, the secure USB storage device 102 could include any number of memories. Also, the functional division shown in FIG. 2 is for illustration only. Various components in FIG. 2 can be omitted, combined, or further subdivided and additional components can be added according to particular needs.

FIG. 3 illustrates an example USB secure microcontroller 204 in a secure USB storage device according to one embodiment of this disclosure. The embodiment of the USB secure microcontroller 204 shown in FIG. 3 is for illustration only. Other embodiments of the USB secure microcontroller 204 may be used without departing from the scope of this disclosure. Also, for ease of explanation, the USB secure microcontroller 204 of FIG. 3 is described as operating in the secure USB storage device 102 of FIG. 2 within the system 100 of FIG. 1. The USB secure microcontroller 204 could be used in any other suitable device and in any other suitable system.

In this example, the USB secure microcontroller 204 includes a processor 302. The processor 302 executes instructions and performs various functions required by the USB secure microcontroller 204. For example, the processor 302 could execute instructions needed to validate the secure USB storage device 102, the user, data to be stored, or requests for data received over the USB bus 122. The processor 302 may also execute instructions to store data in and retrieve data from the memory 208, such as by interacting with the memory controller 206. The processor 302 represents any suitable type and number of processors or controllers. In some embodiments, the processor 302 represents a 32-bit reduced instruction set computer (RISC) processor. In particular embodiments, the processor 302 represents a RISC processor capable of executing native RISC instructions and Java bytecodes.

A memory protection unit (MPU) 304 controls access to and from the processor 302. For example, the memory protection unit 304 could implement firewalls to limit external access to the processor 302, to control access to memory in the USB secure microcontroller 204, and to control access to peripheral components in the USB secure microcontroller 204. The memory protection unit 304 includes any hardware, software, firmware, or combination thereof for limiting or controlling access to or from a processor in a USB secure microcontroller.

USB secure microcontroller 204 in this example also includes three different memories, specifically a ROM 306, an electrically erasable programmable read only memory (EEPROM) 308, and a RAM 310. Each of these memories 306-310 may store any suitable information. For example, the ROM 306 and the EEPROM 308 may store instructions executed by the processor 302, and the RAM 310 may store data used by the processor 302 during execution of the instructions. Each of the memories 306-310 may represent any suitable quantity of memory, such as a 228 kilobyte ROM 306, a 64 kilobyte EEPROM 308, and a 16 kilobyte RAM 310.

The memories 306-310 are coupled to the processor 302 by two buses 312-314. The buses 312-314 are capable of transporting information between components in the USB secure microcontroller 204. For example, the bus 312 may transport data needed by the processor 302 to and from the RAM 310, and the bus 314 may transport instructions needed by the processor 302 to and from the ROM 306 or EEPROM 308. The buses 312-314 represent any suitable structures for transporting information.

As shown in FIG. 3, the USB secure microcontroller 204 also includes various peripherals 316. The peripherals 316 represent circuits or other components that perform various functions in the USB secure microcontroller 204. In this example, the peripherals 316 include a USB device controller 318, an SPI interface 320, and a GPIO interface 322. The USB device controller 318 facilitates access to the USB bus 122 through the USB connector 202. For example, the USB device controller 318 may perform various functions allowing data to be transmitted or received over the USB bus 122. These functions could include supporting communication at different speeds (such as up to twelve megabits per second or more) and supporting communication in different modes (such as control, bulk, interrupt, and isochronous modes). These functions could also include supporting the dynamic configuration of different endpoints (such as up to sixteen endpoints) and performing clock recovery. The USB device controller 318 includes any hardware, software, firmware, or combination thereof facilitating communication over a USB bus.

The SPI interface 320 and GPIO interface 322 facilitate access to the memory controller 206. For example, the SPI interface 320 and GPIO interface 322 may allow the USB secure microcontroller 204 to pass data received from the USB bus 122 to the memory controller 206 for storage in the memory 208. The SPI interface 320 and GPIO interface 322 may also allow the USB secure microcontroller 204 to receive retrieved data from the memory controller 206 and provide the retrieved data to the USB bus 122. In particular embodiments, the GPIO interface 322 could be used to emulate one or more of an SPI interface and an MMC interface. The SPI interface 320 and GPIO interface 322 each includes any hardware, software, firmware, or combination thereof for facilitating communication with a memory controller.

Although FIG. 3 illustrates one example of a USB secure microcontroller 204 in a secure USB storage device, various changes may be made to FIG. 3. For example, the memories 306-310 are shown in FIG. 3 as examples only. Other or additional types of memories could also be used in the USB secure microcontroller 204. Also, while shown in FIG. 3 as including both interfaces 320-322, the USB secure microcontroller 204 could include only one of these interfaces 320-322 or a different interface to the memory controller 206. Further, the USB secure microcontroller 204 could include any other or additional peripherals 316. These could include security mechanisms, timers, random number generators, encryption mechanisms such as Data Encryption Standard (DES) components, and other or additional interfaces such as an Asynchronous Serial Interface (ASI). In addition, the functional division shown in FIG. 3 is for illustration only. Various components in FIG. 3 can be omitted, combined, or further subdivided and additional components can be added according to particular needs.

FIG. 4 illustrates an example memory controller 206 in a secure USB storage device according to one embodiment of this disclosure. The embodiment of the memory controller 206 shown in FIG. 4 is for illustration only. Other embodiments of the memory controller 206 may be used without departing from the scope of this disclosure. Also, for ease of explanation, the memory controller 206 of FIG. 4 is described as operating in the secure USB storage device 102 of FIG. 2 within the system 100 of FIG. 1. The memory controller 206 could be used in any other suitable device and in any other suitable system.

In this example, the memory controller 206 includes an SPI/MMC interface 402. The SPI/MMC interface 402 facilitates communication between the memory controller 206 and the USB secure microcontroller 204 over an SPI or MMC interface. This may allow, for example, the memory controller 206 to receive data for storage in the memory 208 or to provide data retrieved from the memory 208 to the USB secure microcontroller 204. The SPI/MMC interface 402 represents any suitable hardware, software, firmware, or combination thereof for facilitating communication with a USB secure microcontroller. The SPI/MMC interface 402 could, for example, represent an SPI interface or an MMC interface operating as an SPI interface.

The memory controller 206 also includes a memory interface 404. The memory interface 404 facilitates communication with the memory 208. For example, the memory interface 404 may allow the memory controller 206 to store data in particular locations in the memory 208 or to retrieve data from particular locations in the memory 208. The memory interface 404 represents any suitable hardware, software, firmware, or combination thereof for facilitating communication with a memory. The memory interface 404 could, for example, represent or support an MMC interface.

In addition, the memory controller 206 includes a microcontroller/state machine 406. The microcontroller/state machine 406 ensures that appropriate actions are taken to properly write data into the memory 208 or to properly read data from the memory 208. For example, the microcontroller/state machine 406 may need to erase the contents of a particular location in the memory 208 before writing data to that memory location. In this example, the microcontroller/state machine 406 may receive a request to write data to the memory 208. The microcontroller/state machine 406 may then cycles through the appropriate actions to store the data in the memory 208, such as by erasing the current memory contents and then writing the data to the erased memory locations. The microcontroller/state machine 406 includes any hardware, software, firmware, or combination thereof for controlling and facilitating access to a memory.

Although FIG. 4 illustrates one example of a memory controller 206 in a secure USB storage device, various changes may be made to FIG. 4. For example, the memory controller 206 could communicate with the USB secure microcontroller 204 using an interface other than an SPI or MMC interface. Also, the memory controller 206 could include one or multiple interfaces used to communicate with the USB secure microcontroller 204. Further, the memory controller 206 could be coupled to multiple memories or types of memories, and one or multiple memory interfaces 404 could provide access to those memories. In addition, the functional division shown in FIG. 4 is for illustration only. Various components in FIG. 4 can be omitted, combined, or further subdivided and additional components can be added according to particular needs.

Figure 5:
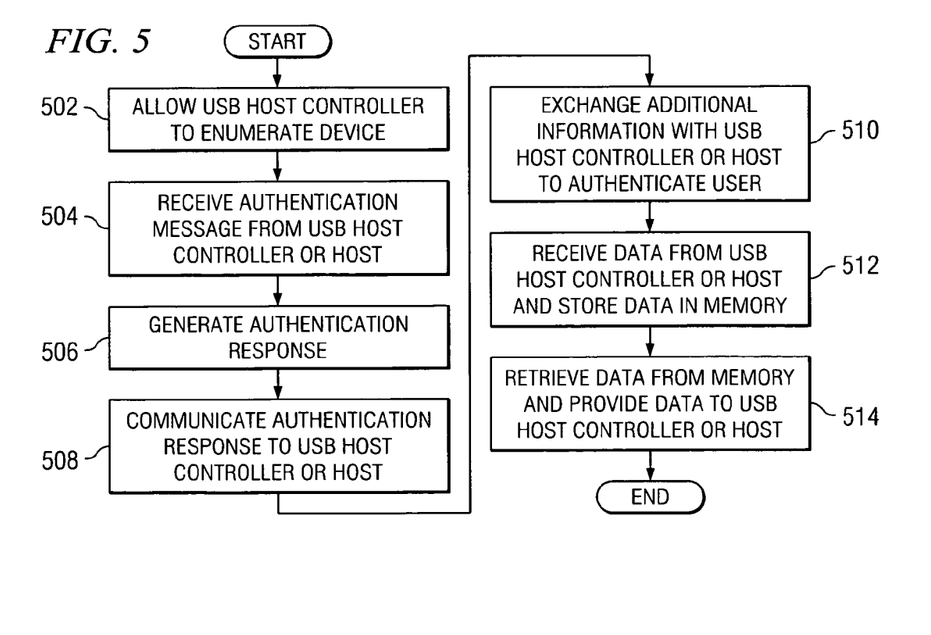
FIG. 5 illustrates an example method for securing data in a USB storage device according to one embodiment of this disclosure.

FIG. 5 illustrates an example method 500 for securing data in a USB storage device according to one embodiment of this disclosure. For ease of explanation, the method 500 is described with respect to the secure USB storage device 102 of FIG. 2 operating in the system 100 of FIG. 1. The method 500 could be used by any other suitable storage device and in any other suitable system.

The secure USB storage device 102 allows a USB host controller to enumerate the device 102 at step 502. This may include, for example, the USB host controller 124 enumerating the device 102 as a CCID device, an ICCID device, a MSC device, a CCID-MSC device, or an ICCID-MSC device.

The secure USB storage device 102 receives an authentication message from the USB host controller or a host at step 504. This may include, for example, the USB secure microcontroller 204 receiving a message from the USB host controller 124 or host 104 requesting a response to a challenge. This may also include the USB secure microcontroller 204 receiving a message from the USB host controller 124 or host 104, where the message is coded using a digital certificate or key. In this document, the phrase "authentication message" refers to any information provided by a USB host controller or host as part of an authentication or validation process.

The secure USB storage device 102 generates an authentication response at step 506. This may include, for example, the USB secure microcontroller 204 using a digital certificate or key stored in the memory 208 to decode the authentication message. This may also include the USB secure microcontroller 204 generating a response containing information expected by the USB host controller 124 or host 104. As a particular example, user biometric authentication could involve connecting a fingerprint or other biometric sub-system to the USB secure microcontroller 204 through the SPI or GPIO interface. In this document, the phrase "authentication response" refers to any information provided in response to an authentication message from a USB host controller or host as part of an authentication or validation process.

The secure USB storage device 102 communicates the authentication response to the USB host controller or host at step 508. This may include, for example, the USB secure microcontroller 204 communicating the generated authentication response over the USB bus 122.

If necessary, the secure USB storage device 102 exchanges additional information with the USB host controller or host to authenticate a user of the device 102 at step 510. This may include, for example, using a user's digital certificate or key stored in the memory 208 to decode another message from the USB host controller 124 or host 104 or send another response to the USB host controller 124 or host 104.

The secure USB storage device 102 receives data from the USB host controller or host and stores the data in a memory at step 512. This may include, for example, the USB secure microcontroller 204 receiving data over the USB bus 122. This may also include the memory controller 206 taking the appropriate actions to store the data in the memory 208. This may further include the USB secure microcontroller 204 verifying or validating the data. In addition, this may include the USB secure microcontroller 204 encrypting unsecured data or decrypting secured data for storage depending on the level of security desired.

The secure USB storage device 102 also retrieves data from the memory and provides the retrieved data to the USB host controller or host at step 514. This may include, for example, the USB secure microcontroller 204 receiving a request for data over the USB bus 122. This may also include the memory controller 206 taking the appropriate actions to retrieve the requested data from the memory 208 and the USB secure microcontroller 204 providing the retrieved data over the USB bus 122. This may further include the USB secure microcontroller 204 verifying or validating the request to retrieve the data. In addition, this may include the USB secure microcontroller 204 encrypting unsecured data or decrypting secured data for transmission, depending on the level of security desired.

Although FIG. 5 illustrates one example of a method 500 for securing data in a USB storage device, various changes may be made to FIG. 5. For example, authentication of the secure USB storage device 102, authentication of the user, and authentication of the data and the request for data may not all be required. In some embodiments, only a subset of these authentications may be adequate under the circumstances. Also, during any particular session involving interaction with the secure USB storage device 102, data could be written to or retrieved from the device 102. A session does not need to involve both writing data to and retrieving data from the secure USB storage device 102. In addition, while shown as a series of steps, various steps shown in FIG. 5 may occur in parallel or at the same time.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A Universal Serial Bus (USB) storage device, comprising:
    a USB secure microcontroller;
    a memory controller configured to store and retrieve data from a memory, wherein the memory controller comprises:
        an interface to the USB secure microcontroller;
        an interface to the memory; and
        at least one of: a microcontroller and a state machine configured to store and retrieve encrypted data from the memory; and
    wherein the USB secure microcontroller is configured to authorize access to the memory through the memory controller, wherein the interface to the USB secure microcontroller comprises at least one of: a Serial Peripheral Interface (SPI) and a MultiMediaCard (MMC) interface, wherein the USB secure microcontroller initiates authentication upon enumeration of the Universal Serial Bus storage device, wherein the enumeration authentication to permit access to the memory through the memory controller is performed through validation by the USB secure microcontroller using authentication information that is stored in a portion of a microcontroller memory disposed in the USB secure microcontroller and not from other storage accessible through the memory controller, and wherein access to the memory through the memory controller is selectively permitted based on a result of the validation prior to data being read from or written to the memory,
    wherein the USB secure microcontroller is configured to authorize access to the memory through the memory controller and to protect data stored in the memory by:
        authenticating the Universal Serial Bus storage device, a user of the Universal Serial Bus storage device, and at least one of received data to be stored in the memory and a request to provide retrieved data from the memory; and
        ensuring that data stored in the memory is encrypted.

2. The Universal Serial Bus storage device of claim 1, wherein the USB secure microcontroller is configured to allow a USB host controller to enumerate the Universal Serial Bus storage device under one or more USB device classes.

3. The Universal Serial Bus storage device of claim 2, wherein the USB secure microcontroller is configured to allow the USB host controller to enumerate the Universal Serial Bus storage device under one of: a Chip Card Interface Device (CCID) class, an Integrated Circuit Card Interface Device (ICCID) class, a Mass Storage Class (MSC), a combination of the CCID class and the MSC class, and a combination of the ICCID class and the MSC class.

4. The Universal Serial Bus storage device of claim 1, wherein the USB secure microcontroller comprises:
    a processor executing instructions to authorize access to the memory through the memory controller and to protect data stored in the memory;
    a USB device controller communicating over a USB bus; and
    an interface to the memory controller.

5. The Universal Serial Bus storage device of claim 1, wherein the validation is a two-way validation of the Universal Serial Bus storage device and a USB host controller enumerating the Universal Serial Bus storage device.

6. The Universal Serial Bus storage device of claim 1, wherein the USB secure microcontroller comprises:
   a memory protection unit configured to control access to the microcontroller memory.

7. The Universal Serial Bus storage device of claim 1, wherein the USB secure microcontroller comprises:
   a processor; and
   a memory protection unit configured to control access to and from the processor.

8. A system, comprising:
   a Universal Serial Bus (USB) secure microcontroller;
   a Universal Serial Bus (USB) host controller coupled to a USB bus; and
   a USB storage device configured to communicate with the Universal Serial Bus host controller, the USB storage device comprising:
   a memory controller configured to store and retrieve data from a memory stored in an encrypted format, wherein the memory controller comprises an interface to the Universal Serial Bus secure microcontroller, the interface comprising at least one of: a Serial Peripheral Interface (SPI) and a MultiMediaCard (MMC) interface; and
   wherein the Universal Serial Bus (USB) secure microcontroller is configured to authorize access to the memory through the memory controller, wherein the Universal Serial Bus secure microcontroller initiates authentication upon enumeration of the USB storage device, wherein the enumeration authentication to permit access to the memory through the memory controller is performed through validation by the Universal Serial Bus secure microcontroller using authentication information that is stored in a portion of a microcontroller memory disposed in the Universal Serial Bus secure microcontroller and not from other storage accessible through the memory controller, and wherein access to the memory through the memory controller is selectively permitted based on a result of the validation prior to data being read from or written to the memory,
   wherein the Universal Serial Bus secure microcontroller is configured to authorize access to the memory through the memory controller and to protect data stored in the memory by:
   authenticating the USB storage device, a user of the USB storage device, and at least one of received data to be stored in the memory and a request to provide the retrieved data from the memory; and
   ensuring that data stored in the memory is encrypted.

9. The system of claim 8, wherein the Universal Serial Bus secure microcontroller is configured to allow the Universal Serial Bus host controller to enumerate the USB storage device under one or more USB device classes.

10. The system of claim 9, wherein the Universal Serial Bus secure microcontroller allows the Universal Serial Bus host controller to enumerate the USB storage device under one of: a Chip Card Interface Device (CCID) class, an Integrated Circuit Card Interface Device (ICCID) class, a Mass Storage Class (MSC), a combination of the CCID class and the MSC class, and a combination of the ICCID class and the MSC class.

11. The system of claim 8, wherein the Universal Serial Bus secure microcontroller comprises:
   an interface to the memory controller, the interface comprising at least one of: a Serial Peripheral Interface (SPI) and a General Purpose Input/Output (GPIO) interface emulating one or more of an SPI interface and a MultiMediaCard (MMC) interface.

12. A method, comprising:
   storing information in and retrieving information from a memory in a Universal Serial Bus (USB) storage device, wherein access to the memory is provided by a memory controller comprising an interface to a USB secure microcontroller, the interface comprising at least one of: a Serial Peripheral Interface (SPI) and a MultiMediaCard (MMC) interface; and
   authorizing access to the memory through the memory controller to thereby secure contents of the memory using the USB secure microcontroller, wherein the USB secure microcontroller initiates authentication upon enumeration of the Universal Serial Bus storage device, wherein the enumeration authentication to permit access to the memory through the memory controller is performed through validation by the USB secure microcontroller using authentication information that is stored in a portion of a microcontroller memory disposed in the USB secure microcontroller and not from other storage accessible through the memory controller, and wherein access to the memory through the memory controller is selectively permitted based on a result of the validation prior to data being read from or written to the memory,
   wherein the USB secure microcontroller is configured to authorize access to the memory through the memory controller and to protect data stored in the memory by:
   authenticating the Universal Serial Bus storage device, a user of the Universal Serial Bus storage device, and at least one of received data to be stored in the memory and a request to provide retrieved data from the memory; and
   ensuring that data stored in the memory is encrypted.

13. The method of claim 12, further comprising:
   interacting with a USB host controller to allow the USB host controller to enumerate the Universal Serial Bus storage device under one of: a Chip Card Interface Device (CCID) class, an Integrated Circuit Card Interface Device (ICCID) class, a Mass Storage Class (MSC), a combination of the CCID class and the MSC class, and a combination of the ICCID class and the MSC class.

14. The method of claim 12, wherein the USB secure microcontroller comprises:
   an interface to the memory controller, the interface comprising at least one of: a Serial Peripheral Interface (SPI) and a General Purpose Input/Output (GPIO) interface emulating one or more of an SPI interface and a MultiMediaCard (MMC) interface.

* * * * *